Jan. 13, 1942.　　　　C. E. DIRKES　　　　2,269,928
LUBRICATING SYSTEM
Filed June 12, 1939　　　　2 Sheets-Sheet 1

INVENTOR.
Carl E. Dirkes
BY Barnes, Kisselle, Laughlin & Raisch
ATTORNEYS

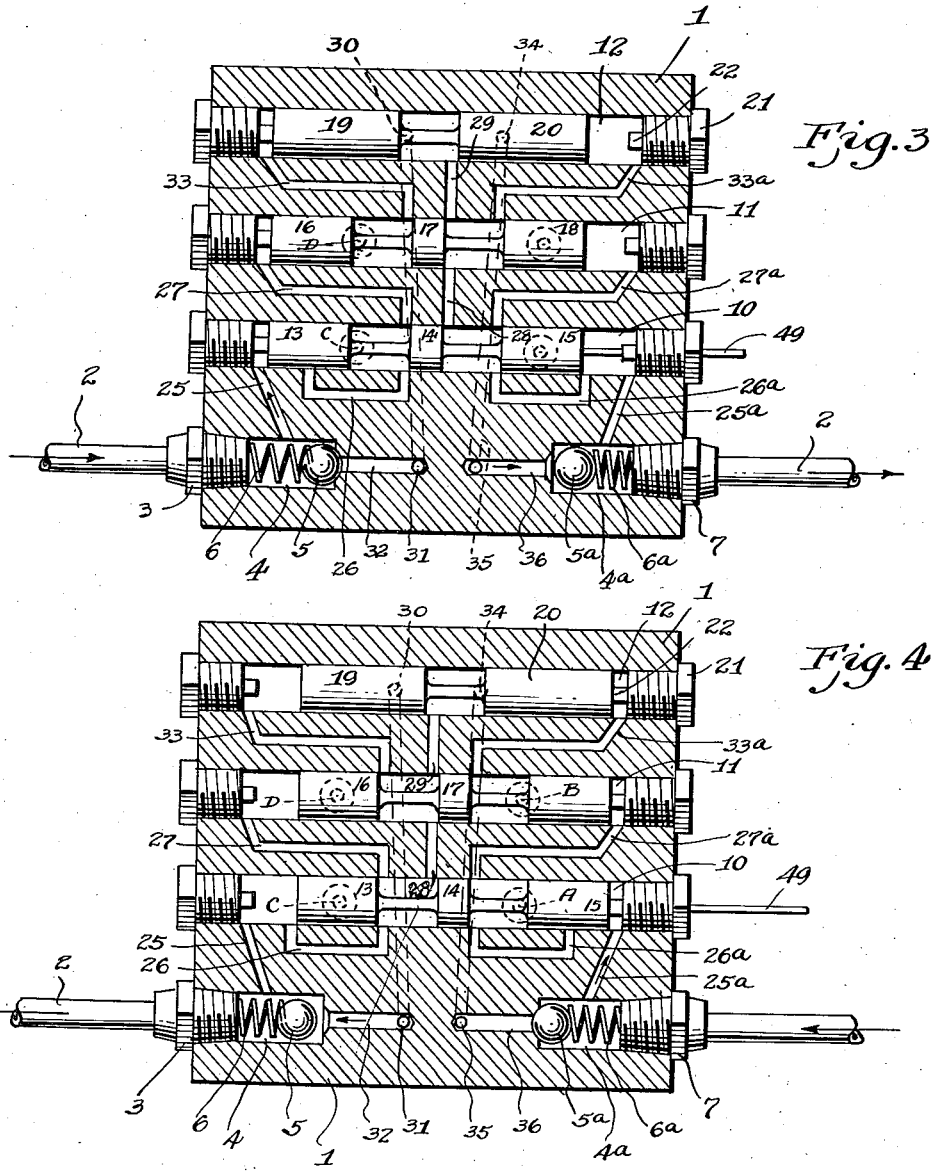

Patented Jan. 13, 1942

2,269,928

UNITED STATES PATENT OFFICE 2,269,928

LUBRICATING SYSTEM

Carl E. Dirkes, Detroit, Mich.

Application June 12, 1939, Serial No. 278,651

4 Claims. (Cl. 184—7)

This invention relates to a lubricating system and a lubricating unit structure useful in such system.

Generally, the principal object of the invention is the provision of a lubricating system, and unit for use therein, of the progressive type. More specifically, the progressive type of system is one where a plurality of units for feeding lubricant to one or more bearings or places requiring lubricant are placed in series or at different locations in a lubricant line or conduit, and as the lubricant is passed through the conduit under pressure, one unit functions to pass lubricant to one or more places requiring lubricant, and then the unit opens in such a manner that lubricant can pass therethrough and through the conduit to the second unit which in turn directs lubricant to one or more places and which, if other units are connected into the line, then opens the line for the lubricant flow to the successive units. In other words, with a plurality of units disposed in a pressure lubricant line, each unit functions to discharge lubricant and then opens the line; in this manner the units operate successively until the last unit in the line has functioned. In this connection the units are so arranged that if the pressure on the lubricant line is then reversed, the units successively function incident to the reverse flow of lubricant. An arrangement for carrying out the invention is disclosed in the accompanying drawings.

Fig. 3 is a cross sectional view taken through a lubricating unit.

Fig. 4 is a cross sectional view taken through the unit shown in Fig. 3 with the parts thereof in a different position.

Figure 1:
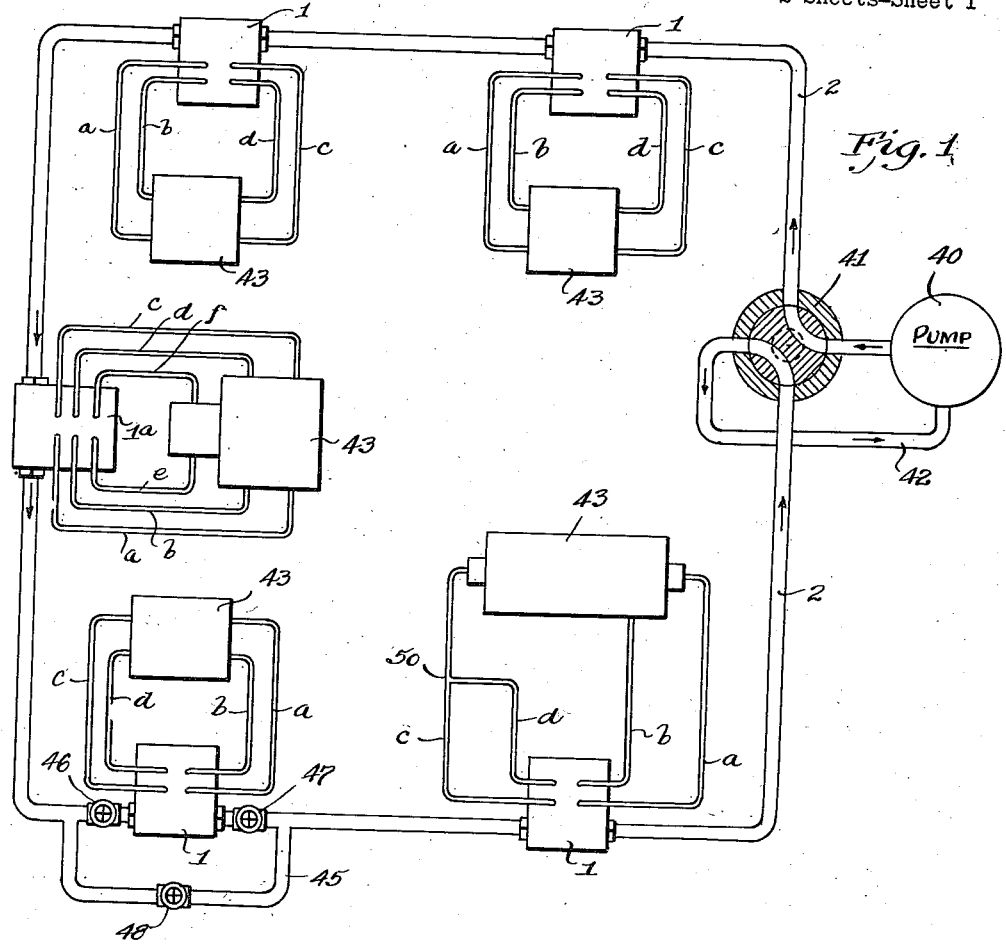
Fig. 1 is a diagrammatic view illustrating a lay-out of the lubrication system and showing the reverse valve in cross section.

The unit may be formed from a single block of metal 1 connected into a lubricant pressure line 2. One connection is shown at 3, the line connecting into chamber 4 with a check valve therein. The check valve shown is in the form of a ball 5 acted upon by a spring 6. The other connection is at 7 with a chamber 4a, check valve 5a, and spring 6a.

The block is provided with a plurality of cylinders, there being shown in the present instance three cylinders 10, 11 and 12. In cylinder 10 is a piston structure having three piston portions or heads 13, 14 and 15; a similar piston with heads 16, 17 and 18 is located in cylinder 11, while a piston with heads 19 and 20 is located in cylinder 12. The ends of the cylinders are closed by plugs 21, each preferably having an extension or teat 22 for stopping the pistons.

There are various ports and passageways in the block interconnecting the cylinders and chambers 4 and 4a, and it is thought that these might best be described by following the flow of lubricant. Assume that lubricant is entering through the connection 3, as indicated by the arrow. The ball check closes the chamber 4 so that lubricant moves through passageway 25 into the left hand end of cylinder 10. The lubricant pushes the piston in cylinder 10 to the right until it is stopped. This position is shown in Fig. 4. The piston head 13 opens the passageway 26 and then lubricant flows through this passageway through the center part of cylinder 10 and into passageway 27 into the left hand end of cylinder 11. The lubricant entering the center part of cylinder 10 can also, as soon as the piston in cylinder 10 has moved to the right, pass through passageway 28, through the center part of cylinder 11, through passageway 29 and into the center part of cylinder 12. From here the lubricant may pass out through port 30 and through line passageway 31 which connects into a line passageway 32. This places lubricant on the opposite side of the ball check 5 and the ball check is thereby merely in a balanced condition.

The lubricant entering the left hand end of cylinder 11 pushes the piston therein to the right, as shown in Fig. 4, and as soon as this position is attained the head 17 uncovers the passageway 28 so that lubricant now passes through the passageway 33 to the left hand end of cylinder 12. Momentarily, the piston head 17 cuts off the passageway 28, but this is of no consequence, since the lubricant is merely under pressure and there is no flow necessary through passageway 28 at that time.

The lubricant entering the left hand end of cylinder 12 pushes the piston therein to the right as shown in Fig. 4. And when the piston reaches the Fig. 4 position, port 30 is covered and port 34 is opened, which connects through passageways 35 and 36 to the chamber 4a. The lubricant under pressure then flows through passageways 25, 26, cylinder 10, passage 28, cylinder 11, passageway 29, port 34 and passageway lines 35 and 36, and then back into the line, the check valve 5a permitting this action.

Reverting now to the original position as shown in Fig. 3: As the lubricant pushes the piston in cylinder 10 to the right, the lubricant in advance of the piston is forced through passageway 25a and along the line. As the piston in cylinder 11 is forced to the right lubricant in the cylinder in advance of the piston is forced out through passageway 27a and into the cylinder 10. At this time the piston in cylinder 10 already had attained the Fig. 4 position so that the outlet port A is uncovered, and therefore the quantity of grease in the right hand end of cylinder 11 in Fig. 3 position is forced through the outlet A. As the piston in cylinder 12 shifts from the Fig. 3 position to the Fig. 4 position, the lubricant in advance thereof is forced through the passageway 33a into the cylinder 11 and out through the outlet port B which is then uncovered by the piston in the cylinder 11. The outlets A and B may connect to conduits a and b as shown in Fig. 1.

Therefore, it will be seen that as lubricant enters the unit from the left, as shown in Fig. 3, that the three pistons will be shifted to the right and definite quantities of lubricant forced through the outlets A and B. The unit now functions no more as long as the pressure is supplied from the left, but it allows the lubricant to pass through the unit.

Now if the direction of the pressure is reversed, the lubricant will enter the chamber 4a, and in this connection Fig. 4 may be considered. Lubricant is checked by the valve 5a and flows through passageway 25a to thus force the piston in cylinder 10 back to the Fig. 3 position. In this action, lubricant is forced through passageway 25 and back into the line. As soon as the piston in cylinder 10 uncovers passageway 26a the lubricant pressure is transmitted through the center part of cylinder 10 through passageway 28 through the center part of cylinder 11 through passageway 29 through the port 34 and lines 35 and 36, and back to the check valve 5a, which is then placed in a substantially balanced condition. Also, the lubricant under pressure passes through passageway 27a to shift the piston in cylinder 11 to the left and when this is accomplished the head 17 uncovers the passageway 33a for the flow of lubricant to the right hand end of cylinder 12 to force the piston therein back to the Fig. 3 position.

As the piston in cylinder 11 is shifted to the left lubricant is forced through the passageway 27 into cylinder 10 and out through the port C which is then uncovered by the piston in cylinder 10. As the piston in cylinder 12 is shifted to the left lubricant is forced through passageway 33 back into cylinder 11 and out through the port D. As soon as the piston in cylinder 12 has shifted back to the Fig. 3 position, the port 30 is opened and the lubricant may then flow through the passageways 31 and 32 and then back into the line past the check valve 5. The outlet ports C and D may be connected to conduits c and d (Fig. 1). The unit is now conditioned for no further operation except that lubricant is permitted to flow therethrough so that, in effect, the pressure line is open.

Figure 2:
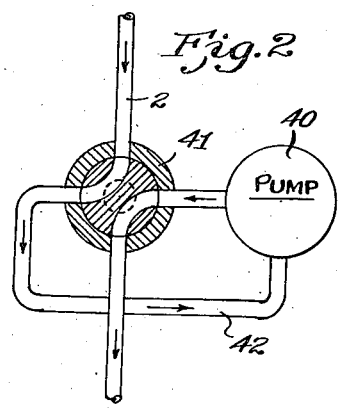
Fig. 2 is a view showing the reversing valve in reverse position.

A plurality of units of this kind may be placed in a system as shown in Fig. 1 wherein there is shown a pump 40 connected to the pressure line 2 by a reversing valve 41. A return line 42 runs from the reversing valve back to the low side of the pump. The several units are indicated at 1 and the pressure line runs through all the units, while different machines or different portions of the same machine are indicated at 43. With the valve positioned as shown in Fig. 1 the lubricant is passed into the line in the direction indicated by the arrow and it moves through the pressure line in a counter-clockwise direction. The lubricant enters the first unit 1 and lubricant is forced through the outlets A and B as above described and into the lines a and b to suitable bearings or points requiring lubrication on the machine or machine part connected thereto. Then the lubricant passes on through the line to the second unit, which may also have two outlets connecting to the conduits a and b. Then the lubricant passes on to the third unit and the fourth and the fifth, and so on for any suitable number of units. The number of cylinders and outlets in a unit may be varied as this merely requires increasing the number of cylinders, and in Fig. 1 the third unit 1a is shown as having three outlets connecting the three lines a, b and e. After the lubricant has caused all of the units to function it may flow back to the low side of the pump through the return line 42 as shown in Fig. 1. If the valve now be reversed to reverse the direction of the flow of lubricant as shown in Fig. 2, the lubricant causes each unit to function reversely as above described, forcing lubricant through the lines c and d and f where three outlets are provided. The reversing valve may be actuated by hand or in an automatic manner, which may be timed.

In some cases it may be desirable to cut out the operation of one or more units and this may be done by arranging a by-pass 45 around a unit together with the use of valves 46, 47 and 48. With the valve 48 in the by-pass closed, the valves 46 and 47 will be open. Conversely, when valve 48 is open valves 46 and 47 will be closed to cut off the lubricant from each side of the unit. Means may be provided for indicating the operation of the units and such a means may be provided on each unit or only one unit in a series. This may take the form of an indicating rod 49 connected to a piston extending out through a plug 21 preferably with the use of a suitable packing gland. The rod is visible and its movement indicates operation of the lubricating device.

In some instances it may be desired to provide an extra large amount of lubricant to one point, and in this case two or more outlet ports or outlet conduits may be joined as indicated at 50 in Fig. 1.

Figure 5:
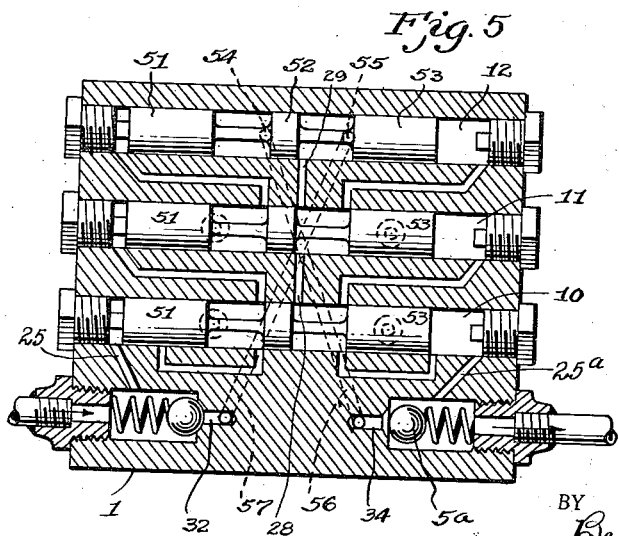
Fig. 5 is a cross sectional view of a unit illustrating a modified form.

A modified form of unit is shown in Fig. 5. This unit, for the most part, embodies the same elements, ports and passageways as the units shown in Figs. 3 and 4 and the same reference characters are applied to corresponding parts. In this form the piston in upper cylinder 12 is fastened with three piston bodies or heads 51, 52 and 53, and the cylinder has intermediate outlet ports 54 and 55 connected respectively with diagonal line passageways 56 and 57 which lead to the inlet and outlet line passageways 34 and 32. Assuming that the lubricant enters from the left in Fig. 5, the several pistons are shifted to the right in the manner above described, but before the piston in cylinder 12 shifts, the lubricant pressure is transmitted through the cylinder 10, passage 28, cylinder 11 and passage 29, into cylinder 12, port 55 and line passage 57. However, as soon as the piston head 52 crosses port 29 the lubricant then passes out the port 54 through diagonal line passage 56 and then past the ball check 5a and on into the line. When the lubricant pressure is reversed the lubricant flows through the unit in the reverse manner.

As pointed out above, the units may each comprise a single block of metal in which the cylinders and passageways are formed and in the forms shown in Figs. 3 and 4, the passageways 31 and 35 will, of course, be positioned back of the cylinders. In the form shown in Fig. 5 the diagonal passageways are back of cylinders but this arrangement requires a block of some additional depth because the diagonal passages must pass each other without communicating with each other.

In fashioning the units from a single block of metal the various passageways in the block will have to be drilled or otherwise formed, and obviously, the drilling tool will have to be passed through the exterior of the block where an interior passageway is formed. Where this is done the opening left adjacent the exterior surface of the block is merely filled or plugged, and for the sake of clarity such data is not shown.

I claim:

1. A lubricant distributing unit comprising a body adapted to be disposed in a lubricant conduit line in which lubricant is to be supplied under pressure alternately in opposite directions, chambers, termed first and second chambers, to which the conduit line is connected, a line passage connecting into each chamber, a check valve in each chamber for closing each line passage against lubricant flow in one direction, a plurality of cylinders, piston means in each cylinder, a passageway extending from each chamber with the passageways connecting to opposite ends of the first cylinder, whereby lubricant supplied under pressure in the first chamber shifts the piston in the first cylinder, passageways connecting successive cylinders and each opened by movement of the piston in one cylinder for the transmission of lubricant under pressure to another cylinder to move the piston in said latter cylinder, whereby the pistons shift in sequence, outlet ports in some of the cylinders, other passageways connecting successive cylinders for the discharge of a quantity of lubricant in advance of the pistons as they shift through some of said outlet ports, and a line port in the cylinder whose piston moves last in the sequence arranged to be opened by the piston therein and connected into the line passage leading to the second chamber for the flow of lubricant through the unit subsequently to the shift of all of said pistons.

2. A lubricant distributing unit comprising a body adapted to be disposed in a lubricant conduit line in which lubricant is to be supplied under pressure alternately in opposite directions, chambers, termed first and second chambers, to which the conduit line is connected, a line passage connecting into each chamber, a check valve in each chamber for closing each line passage against flow of lubricant in one direction, a plurality of cylinders, piston means in each cylinder, a passageway extending from each chamber with the passageways connecting to opposite ends of the first cylinder, whereby lubricant supplied under pressure in the first chamber shifts the piston in the first cylinder, passageways connecting successive cylinders and each opened by movement of the piston in one cylinder for the transmission of lubricant under pressure to another cylinder to move the piston in said latter cylinder, whereby the pistons shift in sequence, outlet ports in some of the cylinders, other passageways connecting successive cylinders for the discharge of a quantity of lubricant in advance of the pistons as they shift through some of said outlet ports, and a line port in the cylinder whose piston moves last in the sequence arranged to be opened by the piston therein and connected into the line passage leading to the second chamber for the flow of lubricant through the unit subsequently to the shift of all of said pistons, said piston in the first cylinder being oppositely moved when lubricant is supplied to the second chamber, and said other passageways being opened successively for the transmission of lubricant to the opposite ends of the cylinders for the discharge of lubricant through the first mentioned passageways and other of said outlet ports, and a second line port in the cylinder whose piston moves last in the sequence arranged to be opened by the piston therein and connected into the line passage leading to the first chamber for the flow of lubricant through the unit subsequently to the reverse shift of all of said pistons.

3. A lubricant distributing unit comprising a body adapted to be disposed in a lubricant conduit line in which lubricant is to be supplied under pressure alternately in opposite directions, first and second chambers into which the line connects, first and second line passages leading respectively into the chambers, a check valve in each chamber for closing each line passage against flow of lubricant in one direction, a plurality of cylinders, piston means in each cylinder, a first set of passages connecting the first chamber and the first cylinder and connecting successive cylinders, including passages leading to one end of each cylinder, a second set of passages connecting the second chamber and the first cylinder and connecting successive cylinders, including passages leading to the opposite end of each cylinder, said pistons adapted to successively shift and arranged to successively open passages in the first set for the successive transmission of lubricant under pressure to successive cylinders when lubricant is supplied from the first chamber, said pistons adapted to shift in like but reverse manner when lubricant is supplied from the second chamber, outlet ports in some of the cylinders, some of the second set of passages serving for the outlet of lubricant when the pistons are shifted by lubricant pressure from the first chamber and some of the first set of passages serving for lubricant outlet when the pistons shift when lubricant is supplied from the second chamber, a port in the cylinder whose piston moves last in the sequence which is opened by movement of the piston therein incident to lubricant supply from the first chamber, and which connects to the second time passage, and another port in the latter cylinder and which is opened by movement of the piston therein incident to the supply of lubricant from the second chamber, and which connects to the first line passage.

4. A lubricant distributing unit adapted to be disposed in a lubricant conduit line in which the lubricant is supplied alternately in opposite directions comprising, inlets connected to the conduit, a line passage extending from each inlet, a check valve for preventing flow of lubricant from each inlet to its connecting line passage, a plurality of cylinders, piston means in each cylinder, a passageway extending from each inlet and connecting to opposite ends of one cylinder for shifting the piston means therein as the lubricant is alternately supplied to the inlets, two sets of passageways connecting successive cylinders arranged to be successively opened to the lubricant supplied alternately to the two inlets by movement of a piston means in a cylinder for the transmission of lubricant to the next cylinder, whereby the piston means shift in sequence when the lubricant is supplied to one inlet and reversely shift in sequence when the lubricant is supplied to the other inlet, outlet ports for connection to points to be lubricated in some of the cylinders for the discharge of lubricant in advance of the piston means through some of the passageways of one set when the lubricant is supplied to the passageways of the other set, the piston means last to move in the sequence having a valving portion for alternately connecting the lubricant supplied inlet to the line passage leading to the other inlet, for the flow of lubricant through the unit subsequently to the shift of the piston means.

CARL E. DIRKES.